(12) United States Patent
Chen et al.

(10) Patent No.: US 12,362,968 B2
(45) Date of Patent: Jul. 15, 2025

(54) METHOD AND APPARATUS FOR DETERMINING DELAY COMPENSATION VALUE, DEVICE, AND STORAGE MEDIUM

(71) Applicant: ZTE CORPORATION, Guangdong (CN)

(72) Inventors: Shijun Chen, Guangdong (CN); Junqiang Li, Guangdong (CN); Dawei Chen, Guangdong (CN); Shizhuang Zhang, Guangdong (CN); Gang Li, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 227 days.

(21) Appl. No.: 18/021,419

(22) PCT Filed: Aug. 13, 2021

(86) PCT No.: PCT/CN2021/112458
§ 371 (c)(1),
(2) Date: Feb. 15, 2023

(87) PCT Pub. No.: WO2022/042333
PCT Pub. Date: Mar. 3, 2022

(65) Prior Publication Data
US 2023/0327914 A1    Oct. 12, 2023

(30) Foreign Application Priority Data
Aug. 25, 2020   (CN) .......................... 202010865324.7

(51) Int. Cl.
*H04L 25/02* (2006.01)
*H04W 56/00* (2009.01)

(52) U.S. Cl.
CPC ..... *H04L 25/0212* (2013.01); *H04W 56/0095* (2013.01)

(58) Field of Classification Search
CPC .................. H04L 25/0212; H04W 56/0095
See application file for complete search history.

(56) References Cited

U.S. PATENT DOCUMENTS

| 10,623,121 B1 | 4/2020 | Satrasala |
| 2005/0163257 A1 | 7/2005 | Keerthi |

(Continued)

FOREIGN PATENT DOCUMENTS

| CN | 102130871 A | 7/2011 |
| CN | 103188189 A | 7/2013 |

(Continued)

OTHER PUBLICATIONS

China National Intellectual Property Administration Search Report issued in CN Application No. 2020108653247, dated Jul. 25, 2024, 8 pages.

(Continued)

*Primary Examiner* — Duc C Ho
(74) *Attorney, Agent, or Firm* — KDW FIRM PLLC (57) ABSTRACT

Provided are a method and apparatus for determining a delay compensation value, a device, and a computer-readable storage medium. The method includes: obtaining a channel frequency domain impulse response of a transmit link, where the transmit link is obtained by combining at least two hardware modules in a transmit circuit, obtaining a time domain impulse response according to the channel frequency domain impulse response, and determining a delay compensation value of the transmit link according to a preset condition and the time domain impulse response.

19 Claims, 7 Drawing Sheets

Obtain a channel frequency domain impulse response of a transmit link, where the transmit link is obtained by combining at least two hardware modules in a transmit circuit — S301

Obtain a time domain impulse response according to the channel frequency domain impulse response — S302

Determine a delay compensation value of the transmit link according to a preset condition and the time domain impulse response — S303

(56) References Cited

U.S. PATENT DOCUMENTS

2010/0190456 A1    7/2010  Asplund
2015/0295733 A1   10/2015  Annavajjala
2021/0352686 A1*  11/2021  Park ..................... H04W 72/20

FOREIGN PATENT DOCUMENTS

| CN | 105007136 A   | 10/2015 |
| CN | 106603447 A   | 4/2017  |
| CN | 112399550 A   | 2/2021  |
| WO | 2019051758 A1 | 3/2019  |

OTHER PUBLICATIONS

China National Intellectual Property Administration Notice of the First Review Opinion in CN Application No. 2020108653247, dated Jul. 29, 2024, 10 pages.
Extended European Search Report issued in EP Application No. 21860172.2, dated Aug. 12, 2024, 8 pages.
International Search Report mailed Oct. 26, 2021, for Application No. PCT/CN2021/112458 (four (4) pages).
Hu et al., "Synchronous measurement for a wideband signal at non-line-of sight", Chinese Journal of Scientific Instrument, vol. 35, No. 11 (Nov. 15, 2014).

* cited by examiner

--Prior Art--

FIG. 1

--Prior Art--

FIG. 11

METHOD AND APPARATUS FOR DETERMINING DELAY COMPENSATION VALUE, DEVICE, AND STORAGE MEDIUM

CROSS-REFERENCES TO RELATED APPLICATIONS

This is a National Stage Application, filed under 35 U.S.C. 371, of International Patent Application No. PCT/CN2021/112458, filed on Aug. 13, 2021, which is based on and claims priority to Chinese Patent Application CN202010865324.7 filed with the China National Intellectual Property Administration (CNIPA) on Aug. 25, 2020, the disclosure of which is incorporated herein by reference in its entirety.

TECHNICAL FIELD

The present application relates to the field of wireless communication technologies, for example, a method and apparatus for determining a delay compensation value, a device and a storage medium.

BACKGROUND

Figure 1:
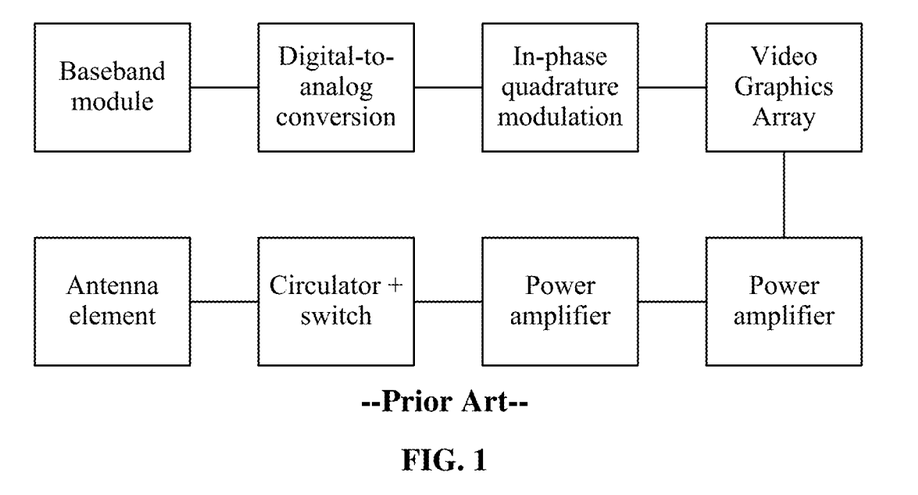
FIG. 1 is a diagram of a wireless signal transmit link in the related art.

In the field of the fifth-generation mobile communication technology (5G), methods adopting such as received signal strength indicator (RSSI), time difference of arrival (TDOA), angle of arrival (AOA) and round-trip time (RTT) are generally used for positioning in the 5G communication system. Time-based positioning methods such as TDOA and RTT are generally used for high-precision positioning. The time-based positioning methods require a transmit device to have a high-precision synchronization performance or to have the ability to measure and compensate for a synchronization error. As shown in FIG. 1, a hardware link from the generation of a baseband signal to transmission at an antenna port requires a series of hardware modules and links including a baseband module, digital-to-analog conversion, in-phase quadrature modulation, a Video Graphics Array, a power amplifier, a power amplifier, a circulator+switch and an antenna element. These links lead to a delay error, thereby affecting signal synchronization precision and the final positioning precision.

Figure 2:
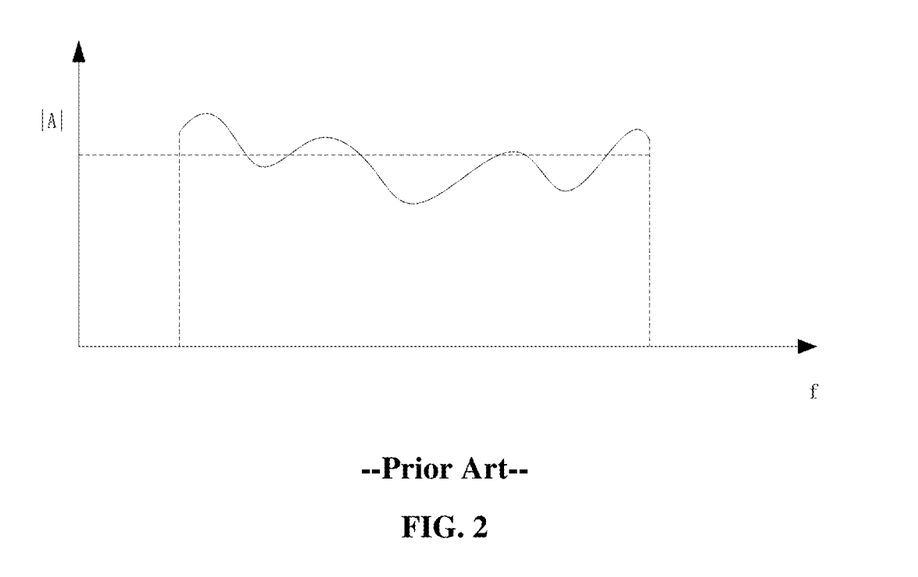
FIG. 2 is a diagram of a compensation principle of an average method in the related art.

In the related art, multiple test signals are input to test the delays of multiple modules, and then the average value of the delays of the multiple modules is configured as the compensation value, which is shown in FIG. 2. However, a larger error exists in this manner, and the delay error is further expanded after multiple hardware modules are stacked, so it is difficult to achieve high-precision delay compensation.

SUMMARY

Embodiments of the present application provide a method and apparatus for determining a delay compensation value, a device and a storage medium so that a channel frequency domain impulse response of a transmit link can be determined by combining hardware modules, and a delay compensation value of the transmit link can be further determined, thereby achieving high-precision delay compensation of the complex hardware link.

An embodiment of the present application provides a method for determining a delay compensation value. The method includes the steps below.

A channel frequency domain impulse response of a transmit link is obtained, where the transmit link is obtained by combining at least two hardware modules in a transmit circuit.

A time domain impulse response is obtained according to the channel frequency domain impulse response.

A delay compensation value of the transmit link is determined according to a preset condition and the time domain impulse response.

An embodiment of the present application provides an apparatus for determining a delay compensation value. The apparatus includes a determination module and a conversion module The determination module is configured to obtain a channel frequency domain impulse response of a transmit link, where the transmit link is obtained by combining at least two hardware modules in a transmit circuit.

The conversion module is configured to obtain a time domain impulse response according to the channel frequency domain impulse response.

The determination module is further configured to determine a delay compensation value of the transmit link according to a preset condition and the time domain impulse response.

An embodiment of the present application provides a device including a memory, a processor, and a computer program stored in the memory and executable by the processor, where when executed by the processor, the computer program causes the processer to perform the method for determining a delay compensation value according to embodiments of the present application. An embodiment of the present application provides a computer-readable storage medium storing a computer program which, when executed by a processer, causes the processor to perform the method for determining a delay compensation value according to embodiments of the present application.

DETAILED DESCRIPTION

Embodiments of the present application are described hereinafter in detail with reference to the drawings. It is to be noted that if not in collision, embodiments of the present application and features therein may be combined with each other in any manner.

Figure 3:
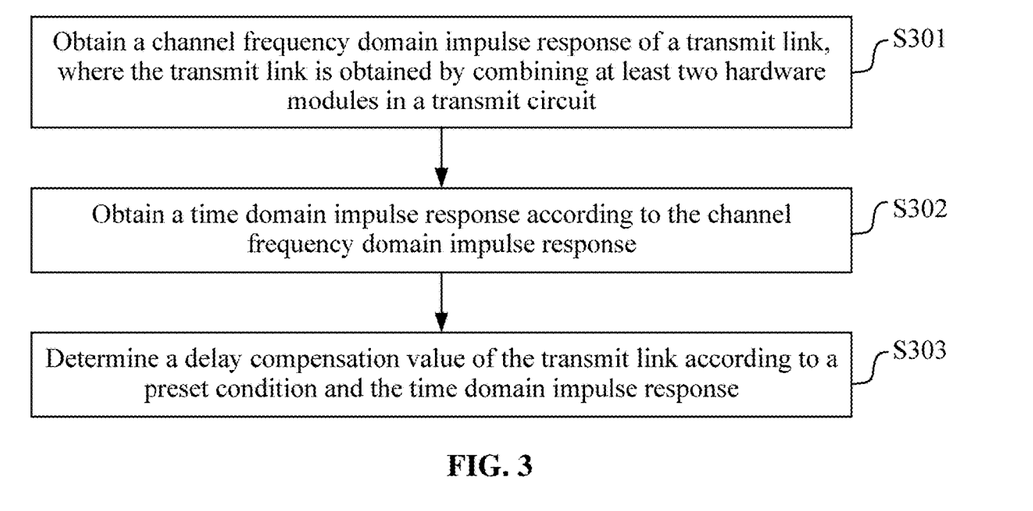
FIG. 3 is a flowchart of a method for determining a delay compensation value according to an embodiment of the present application.

FIG. 3 is a flowchart of a method for determining a delay compensation value according to an embodiment of the present application. The method is applicable to a hardware transmit circuit. As shown in FIG. 3, the method may include the steps below.

In S301, a channel frequency domain impulse response of a transmit link is obtained, where the transmit link is obtained by combining at least two hardware modules in a transmit circuit. Exemplarily, the hardware transmit circuit may include a hardware chip, a switch, a module or a line. In this step, the transmit link obtained by combination may be understood as combining the hardware chip, the switch, the module and the line in the hardware transmit circuit according to actual requirements so that a hardware module set can be obtained. Multiple modules in the hardware module set form the transmit link, so the channel frequency domain impulse response of the transmit link is determined according to the transmit link obtained by combination.

In S302, a time domain impulse response is obtained according to the channel frequency domain impulse response.

The obtained channel frequency domain impulse response of the transmit link is converted to obtain the time domain impulse response. For example, the inverse fast Fourier transform (IFFT) is used for converting the channel frequency domain impulse response into the time domain impulse response.

In S303, a delay compensation value of the transmit link is determined according to a preset condition and the time domain impulse response.

Due to the presence of multiple time domain impulse responses, a time domain impulse response satisfying the condition may be selected based on the preset condition, and the delay compensation value of the transmit link is determined according to the selected time domain impulse response.

The time domain impulse response may be a path signal or an impulse pulse.

Exemplarily, the preceding preset condition may be that the preset threshold is exceeded, that is, a pulse signal whose signal strength exceeds the preset threshold is determined, so the delay compensation value of the transmit link is determined according to the delay of the pulse signal exceeding the preset threshold.

In the method for determining a delay compensation value according to this embodiment of the present application, the channel frequency domain impulse response of the transmit link is obtained, where the transmit link is obtained by combining the at least two hardware modules in the transmit circuit, the time domain impulse response is obtained according to the channel frequency domain impulse response, and the delay compensation value of the transmit link is determined according to the preset condition and the time domain impulse response. In this manner, the high-precision delay compensation of the complex hardware link can be achieved so that the positioning precision obtained based on the delay compensation value can be improved.

Figure 4:
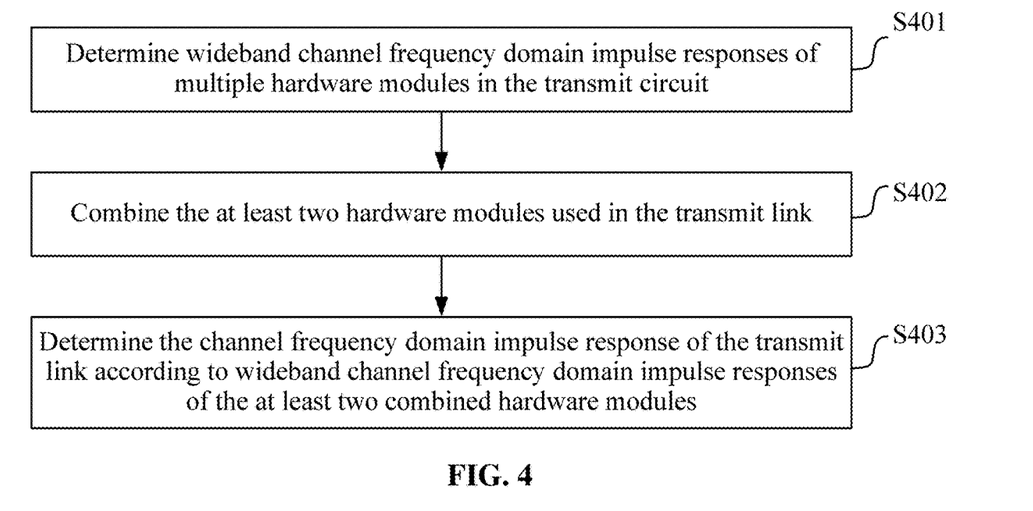
FIG. 4 is a flowchart of a method for determining a delay compensation value according to another embodiment of the present application.

As shown in FIG. 4, in an embodiment, the implementation of obtaining the channel frequency domain impulse response of the transmit link in the preceding S301 may include, but is not limited to, the steps below.

In S401, wideband channel frequency domain impulse responses of multiple hardware modules in the transmit circuit are determined.

Exemplarily, the implementation of this step may include the process below.

In step one: all subcarriers of different frequencies into which a set band is divided are successively input into the current module, and the output by the current module with regard to the all subcarriers is used as the wideband channel frequency domain impulse response of the current module.

In step two: the next module in the transmit circuit is configured as the current module.

Steps one and two are repeated unit the wideband channel frequency domain impulse responses of the multiple modules in the transmit circuit are determined.

That is, after the set band is divided into multiple subcarriers of different frequencies, each divided subcarrier is input into the multiple hardware modules in the hardware transmit circuit to obtain the channel frequency domain impulse response of each hardware module with regard to each subcarrier.

In S402, among the multiple hardware modules in the transmit circuit, the at least two hardware modules used in the transmit link are combined.

A module used in the transmit link may be any of the multiple hardware modules, such as a switch and a hardware chip, and the modules selected by the transmit link may be combined by selecting required modules from the multiple hardware modules in the transmit circuit according to the situation.

In S403, the channel frequency domain impulse response of the transmit link is determined according to wideband channel frequency domain impulse responses of the at least two combined hardware modules.

Since the wideband channel frequency domain impulse responses of the multiple hardware modules in the hardware transmit circuit are determined in S401, the channel frequency domain impulse response of the transmit link can be determined according to the wideband channel frequency domain impulse responses of the preceding at least two combined hardware modules. For example, the wideband channel frequency domain impulse responses of the at least two combined hardware modules are multiplied to obtain the channel frequency domain impulse response of the transmit link.

Figure 5:
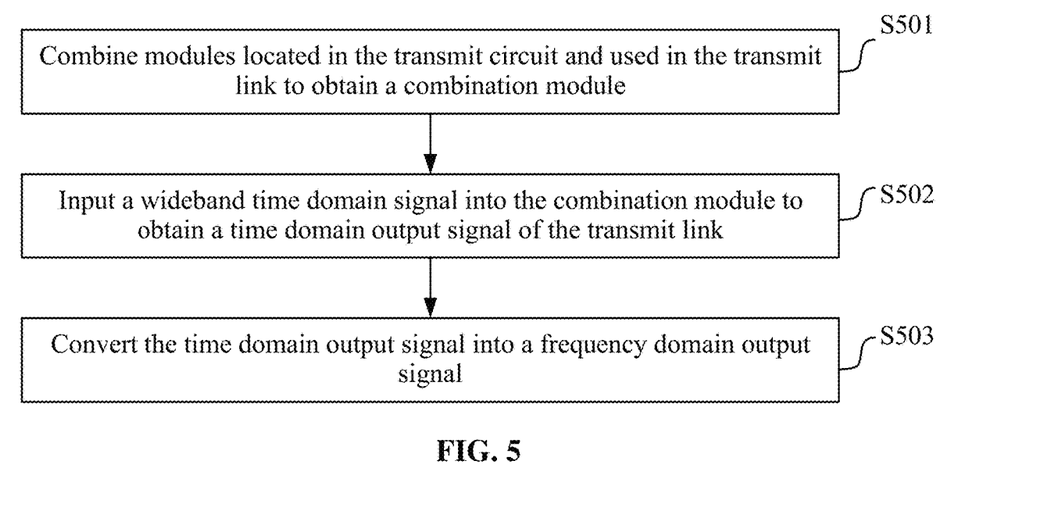
FIG. 5 is a flowchart of a method for determining a delay compensation value according to another embodiment of the present application.

As shown in FIG. 5, in an embodiment, the implementation of obtaining the channel frequency domain impulse response of the transmit link in the preceding S301 may include, but is not limited to, the steps below.

In S501, modules located in the transmit circuit and used in the transmit link are combined to obtain a combination module.

That is, the modules used in the transmit link are selected from the hardware transmit circuit and are combined to obtain an integrated module that is determined as the combination module. It is to be understood that a module used in the transmit link may be any module in the transmit circuit.

In S502, a wideband time domain signal is input into the combination module to obtain a time domain output signal of the transmit link.

Since the obtained combination module is regarded as a whole, after the wideband time domain signal is input into the combination module, the time domain output signal output by the combination module is the time domain output signal of the transmit link.

In S503, the time domain output signal is converted into a frequency domain output signal. For example, the fast Fourier transform (FFT) may be used for converting the time domain output signal into the frequency domain output signal.

In S504, the wideband time domain signal is converted into a frequency domain input signal. Similarly, the FFT may be used for converting the wideband time domain signal input into the combination module into the frequency domain input signal.

In S505, the frequency domain output signal is divided by the frequency domain input signal to obtain the wideband channel frequency domain impulse response of the transmit link. In an example, in the preceding S303, the implementation of determining the delay compensation value of the transmit link according to the delay of the pulse signal exceeding the preset threshold may be that the delay of the first pulse signal is determined as the delay compensation value of the transmit link.

For example, the obtained multiple pulse signals are sorted by delays. That is, $P_{i,t} < P_{i+1,t}$. If $P_{x,a}$ is greater than the preset threshold, and $P_{x,a} > P_{Y,a}$, and $P_{x,t} > P_{Y,t}$, the determined delay of the transmit link is $P_{x,t}$.

$P_{x,a}$ represents the strength of the x-th pulse signal, and $P_{x,t}$ represents the delay of the x-th pulse signal.

Figure 6:
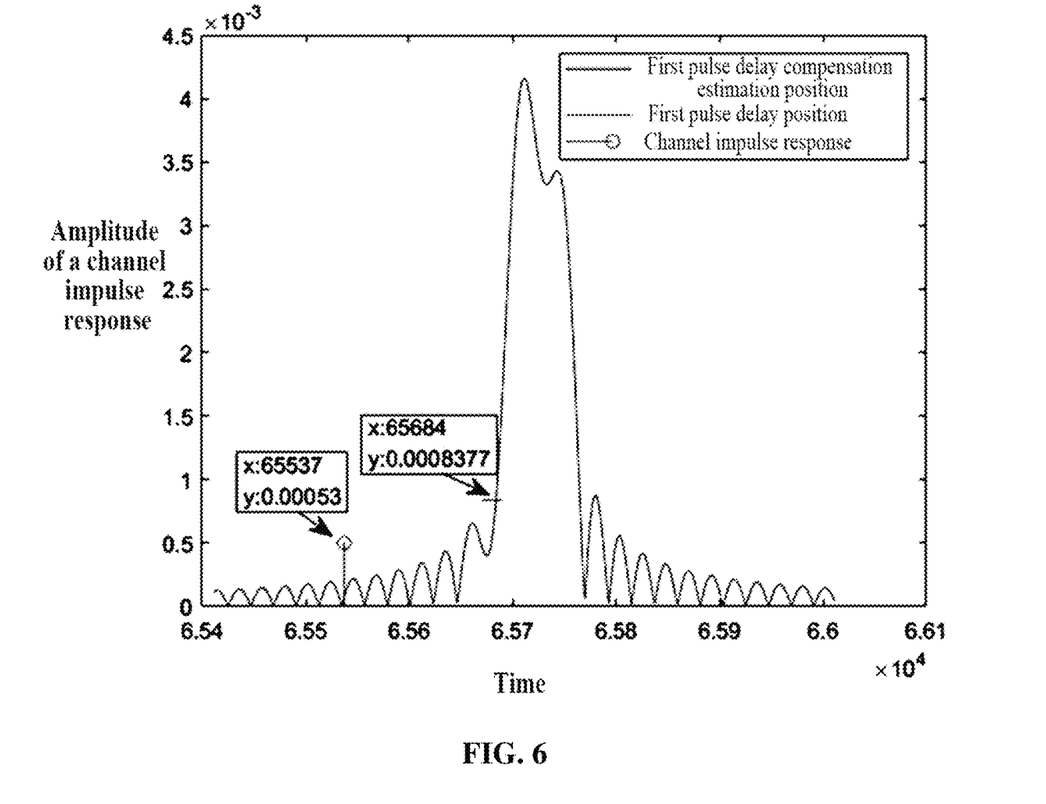
FIG. 6 is a diagram of a time domain impulse response corresponding to combination of modules used in a transmit link according to an embodiment of the present application.
Figure 7:
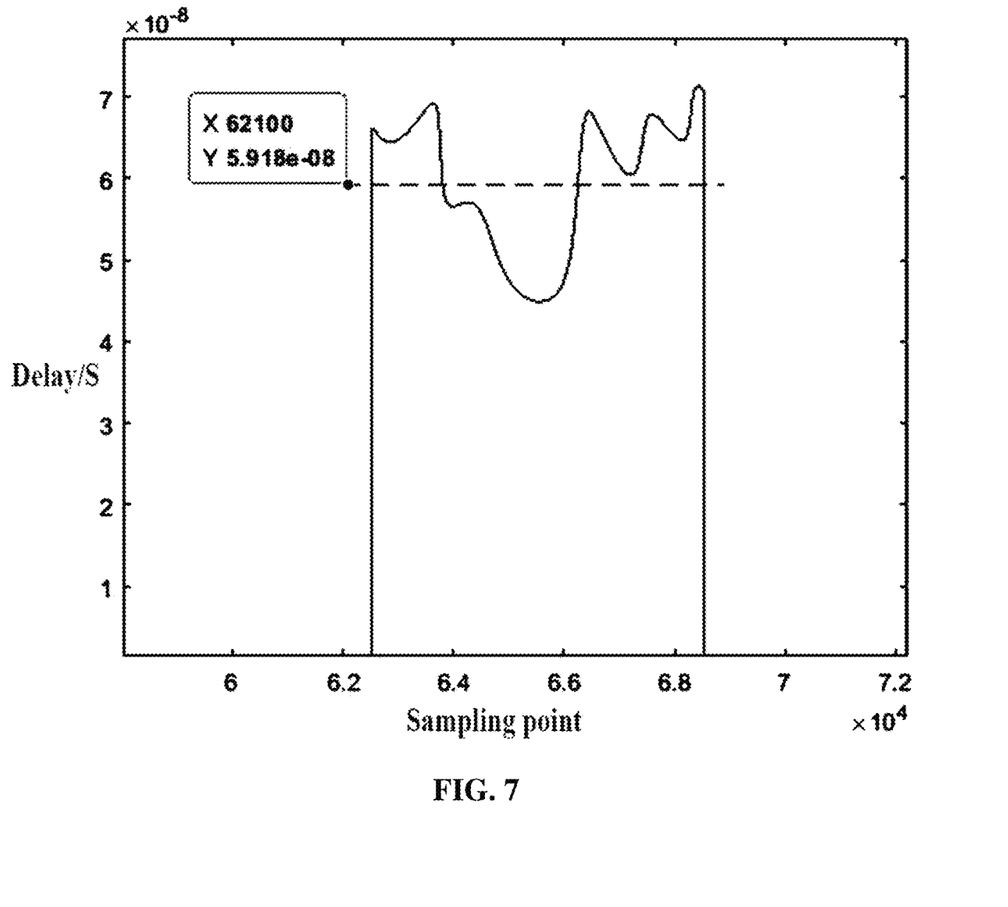
FIG. 7 is a diagram illustrating estimation of the average delay of multiple subcarriers in the related art.

The preceding process is described in detail using an example. For example, it is assumed that there are three modules including module a, module b and module c. A wideband time domain signal is input into the three modules, the sampling period is Ts=8 ns, the oversampling multiple is 16, and the time position corresponding to the delay of the first pulse signal is 65537. A time domain channel of a pulse signal is created for module a, the signal has no attenuation, and the delay is 1 Ts. Time domain channels of two pulse signals are created for module b, the attenuations of the time domain channels of two pulse signals are 0.5 and 1, and the delays of the time domain channels of two pulse signals are 2 Ts and 4 Ts. Time domain channels of two pulse signals are created for module c, the attenuations of the time domain channels of two pulse signals are 0.7 and 1, and the delays of the time domain channels of two pulse signals are 6 Ts and 8 Ts. The wideband channel frequency domain impulse responses of the three modules are measured separately and then are combined and calculated to obtain the channel frequency domain impulse response of the entire transmit link. The obtained channel frequency domain impulse response is converted into the time domain impulse response. See FIG. 6. Delay estimation is performed on the time domain impulse response of the transmit link, and the delay of the first pulse signal exceeding the preset threshold is used as the delay compensation value of the transmit link. As shown in FIG. 6, the time position corresponding to the estimated delay of the first pulse signal is 65684, that is, the corresponding delay compensation value of the transmit link is $(65684-65537)/16 \approx 9.1875$ Ts. In the related art, the delay of each subcarrier is calculated by changing the received data to the frequency domain, the average value of the subcarriers is calculated and used as the delay compensation value, and the finally obtained average delay compensation value is about $5.9183 \times 10^{-8}$, that is, 59.183 ns, which is about 7.3979 Ts. See FIG. 7. In contrast, the method according to this embodiment of the present application can increase the error by 1.7896 Ts compared with the delay compensation value obtained by estimation in the related art.

In another manner, the modules after combination are regarded as an integrated module, that is, the combination module. The channel impulse response passes through the system constituted by all the modules of the entire link, and the impulse response output by the link is used as the channel frequency domain impulse response of the entire transmit link so that the delay compensation value can be obtained.

Figure 8:
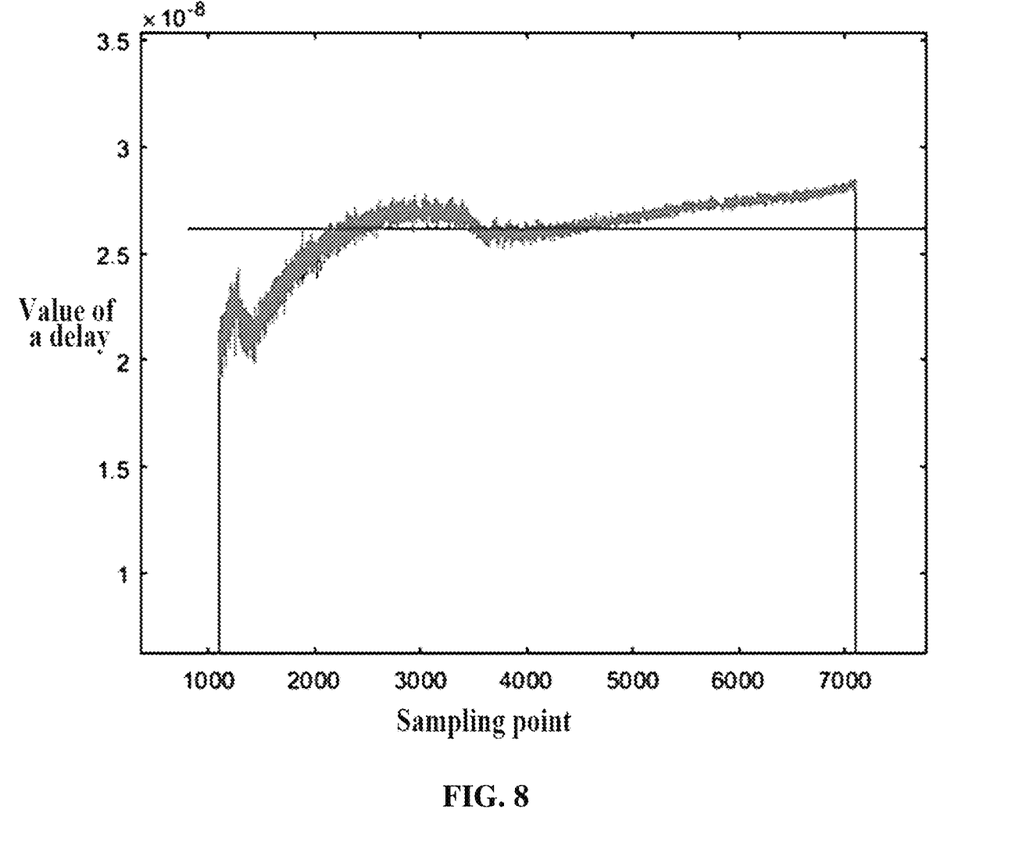
FIG. 8 is a diagram illustrating estimation of the average value of delays of module integration in the related art.

As shown in FIG. 8, in the related art, the received integrated output data is changed to the frequency domain, the delay of each subcarrier is calculated, the average value is determined, that is, the delay compensation value of the entire transmit link, and the average delay compensation value obtained by calculation is about $2.6164 \times 10^{-8}$, that is, 26.164 ns, which is about 3.2705 Ts.

Figure 9:
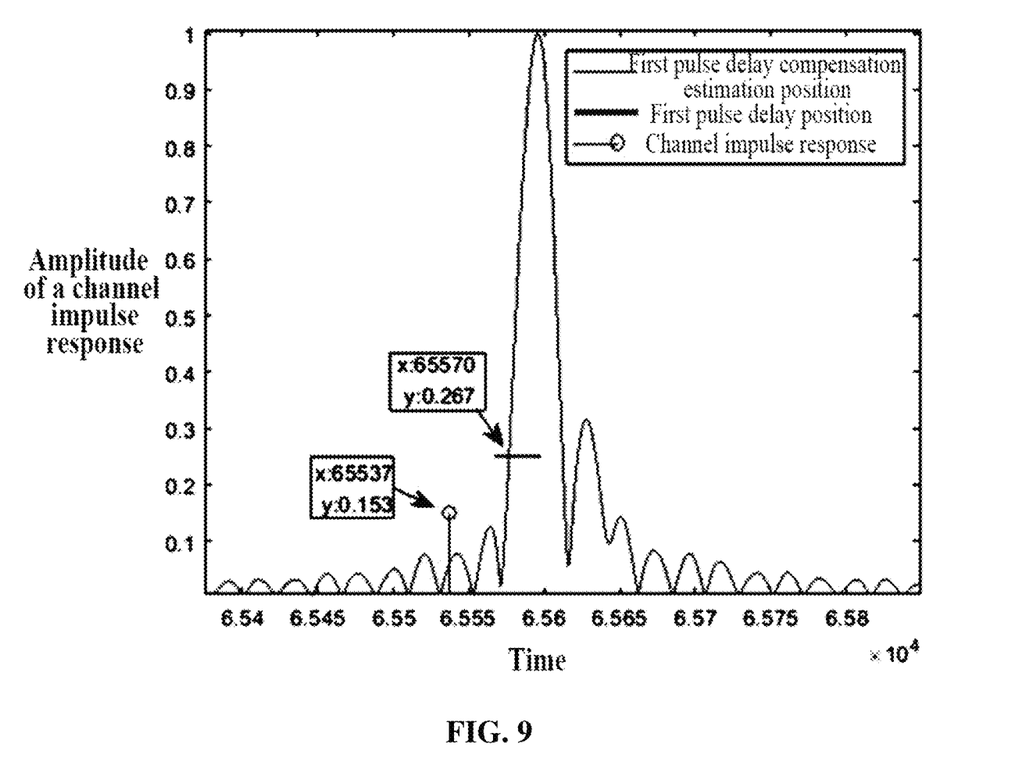
FIG. 9 is a diagram of a time domain impulse response corresponding to a combination module according to an embodiment of the present application.

Based on the method according to this embodiment of the present application, delay estimation is performed on the obtained integrated time domain impulse response, and the delay of the first pulse signal satisfying the preset condition is used as the delay compensation value. As shown in FIG. 9, the position corresponding to the estimated delay of the first pulse signal is 65570, that is, the corresponding delay compensation value is $(65570-65537)/16 \approx 2.062$ Ts.

Figure 10:
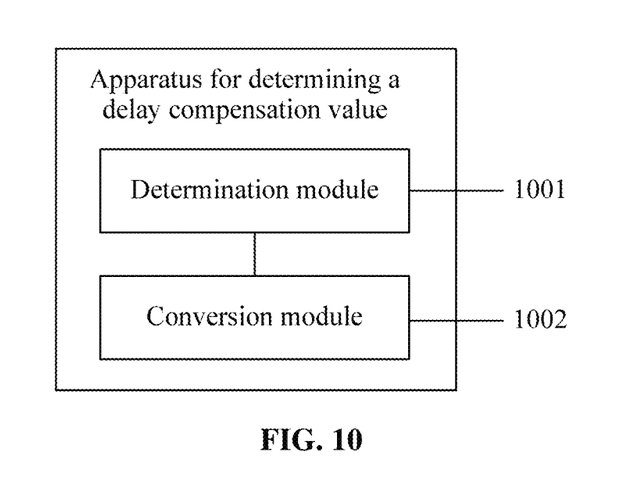
FIG. 10 is a diagram illustrating the structure of an apparatus for determining a delay compensation value according to an embodiment of the present application.

FIG. 10 is a diagram illustrating the structure of an apparatus for determining a delay compensation value according to an embodiment of the present application. As shown in FIG. 10, the apparatus includes a determination module 1001 and a conversion module 1002.

The determination module is configured to obtain a channel frequency domain impulse response of a transmit link, where the transmit link is obtained by combining at least two hardware modules in a transmit circuit.

The conversion module is configured to obtain a time domain impulse response according to the channel frequency domain impulse response.

The determination module is further configured to determine a delay compensation value of the transmit link according to a preset condition and the time domain impulse response.

In an example, the preceding determination module is configured to determine wideband channel frequency domain impulse responses of multiple hardware modules in the transmit circuit, combine the at least two hardware modules used in the transmit link and according to wideband channel frequency domain impulse responses of the at least two combined hardware modules, determine the channel frequency domain impulse response of the transmit link. A module used in the transmit link is any of the multiple hardware modules.

Exemplarily, the determination module may determine the wideband channel frequency domain impulse responses of the preceding multiple hardware modules in the following manner.

In step one: all subcarriers of different frequencies into which a set band is divided are successively input into the current module, and the output by the current module with regard to the all subcarriers is used as the wideband channel frequency domain impulse response of the current module.

In step two: the next module in the transmit circuit is used as the current module.

Steps one to two is repeated unit the wideband channel frequency domain impulse responses of the multiple modules in the transmit circuit are determined.

In an example, the preceding determination module is further configured to multiply the wideband channel frequency domain impulse responses of the at least two hardware modules to determine the channel frequency domain impulse response of the transmit link.

In an example, the preceding determination module may include a conversion unit and a calculation unit.

The determination module is configured to combine modules located in the transmit circuit and used in the transmit link to obtain a combination module and input a wideband time domain signal into the combination module to obtain a time domain output signal of the transmit link. A module used in the transmit link is any module in the transmit circuit.

The conversion unit is configured to convert the time domain output signal into a frequency domain output signal and convert the wideband time domain signal into a frequency domain input signal.

The calculation unit is configured to divide the frequency domain output signal by the frequency domain input signal to obtain the wideband channel frequency domain impulse response of the transmit link.

In an example, the preceding determination module is further configured to determine a pulse signal whose signal strength exceeds the preset threshold in the time domain impulse response and according to the delay of the pulse signal, determine the delay compensation value of the transmit link.

Exemplarily, the implementation of determining the delay compensation value of the transmit link by the determination module may include that the delay of the first pulse signal is determined as the delay compensation value of the transmit link.

The apparatus for determining a delay compensation value according to this embodiment is configured to perform the method for determining a delay compensation value of the embodiments shown in FIGS. 3, 4 and 5. The implementation principle and technical effects are similar and are not repeated here.

Figure 11:
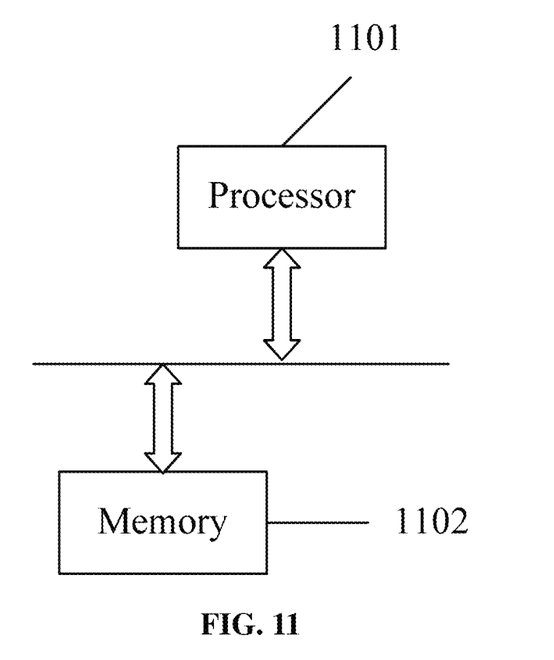
FIG. 11 is a diagram illustrating the structure of a device according to an embodiment of the present application.

FIG. 11 is a diagram illustrating the structure of a device according to an embodiment of the present application. As shown in FIG. 11, the device includes a processor 1101 and a memory 1102. The number of processors 1101 in the device may be one or more, and one processor 1101 is used as an example in FIG. 11. The processor 1101 and the memory 1102 in the device may be connected through a bus or in other ways. The connection through the bus is used as an example in FIG. 11. As a computer-readable storage medium, the memory 1102 may be configured to store software programs, computer-executable programs and modules, such as program instructions/modules (for example, the determination module 1001 and the conversion module 1002 in FIG. 10) corresponding to the method in the embodiments of the present application shown in FIGS. 1, 2 and 3. The processor 1101 executes the software programs, instructions and modules stored in the memory 1102 to perform the method in the embodiments of FIGS. 3, 4 and 5.

The memory 1102 may mainly include a program storage region and a data storage region, where the program storage region may store an operating system and an application program required by at least one function while the data storage region may store data created according to the use of a set-top box. Additionally, the memory 1102 may include a high-speed random-access memory and may also include a nonvolatile memory, such as at least one disk memory, flash memory, or another nonvolatile solid-state memory.

In an example, where possible, the processor in the preceding node may also perform the preceding method for determining a delay compensation value through a hardware circuit, such as an internal logic circuit or a gate circuit.

An embodiment of the present application further provides a computer-readable storage medium storing one or more programs which, when executable by one or more processors, cause the one or more processors to perform the method for determining a delay compensation value according to the embodiments of FIGS. 3, 4 and 5.

It is to be understood by those of ordinary skill in the art that some or all steps in the preceding disclosed method and function modules/units in the device may be implemented as software, firmware, hardware and suitable combinations thereof.

In the hardware implementation, the division of the preceding function modules/units may not correspond to the division of physical components. For example, one physical component may have multiple functions, or one function or step may be performed jointly by several physical components. Some or all physical components may be implemented as software executed by a processor, such as a central processing unit, a digital signal processor or a microprocessor, may be implemented as hardware, or may be implemented as integrated circuits, such as application-specific integrated circuits. Such software may be distributed on computer-readable media. The computer-readable media may include computer storage media (or non-transitory media) and communication media (or transitory media). As is known to those of ordinary skill in the art, the term computer storage media include volatile and non-volatile as well as removable and non-removable media implemented in any method or technology for storing information (such as computer-readable instructions, data structures, program modules, or other data). The computer storage media include, but are not limited to, a random-access memory (RAM), a read-only memory (ROM), an electrically erasable programmable read-only memory (EEPROM), a flash memory or other memory technologies, a compact disc read-only memory (CD-ROM), a digital versatile disc (DVD) or other optical disc storages, a magnetic cassette, a magnetic tape, a magnetic storage or other magnetic storage devices, or any other medium that can be used for storing desired information and can be accessed by a computer. Moreover, as is known to those of ordinary skill in the art, the communication media generally include computer-readable instructions, data structures, program modules or other data in carriers or in modulated data signals transported in other transport mechanisms and may include any information delivery medium.

What is claimed is:

1. A method for determining a delay compensation value, comprising:

obtaining a channel frequency domain impulse response of a transmit link, wherein the transmit link is obtained by combining at least two hardware modules in a transmit circuit;

obtaining a time domain impulse response according to the channel frequency domain impulse response; and determining a delay compensation value of the transmit link according to a preset condition and the time domain impulse response.

2. The method according to claim 1, wherein the obtaining the channel frequency domain impulse response of the transmit link comprises:

determining wideband channel frequency domain impulse responses of a plurality of hardware modules in the transmit circuit;

combining the at least two hardware modules among the plurality of hardware modules used in the transmit link; and determining the channel frequency domain impulse response of the transmit link according to wideband channel frequency domain impulse responses of the at least two combined hardware modules.

3. The method according to claim 2, wherein the determining the wideband channel frequency domain impulse responses of the plurality of hardware modules in the transmit circuit comprises:

successively inputting, into a current module, all subcarriers of different frequencies into which a set band is divided and using an output by the current module with regard to the all subcarriers as a wideband channel frequency domain impulse response of the current module;

configuring a next module in the transmit circuit as the current module; and repeatedly performing the step of successively inputting, into the current module, the all subcarriers of different frequencies into which the set band is divided, using the output by the current module with regard to the all subcarriers as the wideband channel frequency domain impulse response of the current module and configuring the next module in the transmit circuit as the current module until the wideband channel frequency impulse responses of the plurality of hardware modules in the transmit circuit are determined.

4. The method according to claim 3, wherein the determining the delay compensation value of the transmit link according to the preset condition and the time domain impulse response comprises:

determining a pulse signal whose signal strength exceeds a preset threshold in the time domain impulse response; and determining the delay compensation value of the transmit link according to a delay of the pulse signal.

5. The method according to claim 2, wherein the determining the channel frequency domain impulse response of the transmit link according to the wideband channel frequency domain impulse responses of the at least two combined hardware modules comprises:

multiplying the wideband channel frequency domain impulse responses of the at least two combined hardware modules to determine the channel frequency domain impulse response of the transmit link.

6. The method according to claim 5, wherein the determining the delay compensation value of the transmit link according to the preset condition and the time domain impulse response comprises:

determining a pulse signal whose signal strength exceeds a preset threshold in the time domain impulse response; and determining the delay compensation value of the transmit link according to a delay of the pulse signal.

7. The method according to claim 2, wherein the determining the delay compensation value of the transmit link according to the preset condition and the time domain impulse response comprises:

determining a pulse signal whose signal strength exceeds a preset threshold in the time domain impulse response; and determining the delay compensation value of the transmit link according to a delay of the pulse signal.

8. The method according to claim 1, wherein the obtaining the channel frequency domain impulse response of the transmit link comprises:

combining the at least two hardware modules located in the transmit circuit and used in the transmit link to obtain a combination module;

inputting a wideband time domain signal into the combination module to obtain a time domain output signal of the transmit link;

converting the time domain output signal into a frequency domain output signal;

converting the wideband time domain signal into a frequency domain input signal; and dividing the frequency domain output signal by the frequency domain input signal to obtain the wideband channel frequency domain impulse response of the transmit link.

9. The method according to claim 8, wherein the determining the delay compensation value of the transmit link according to the preset condition and the time domain impulse response comprises:

determining a pulse signal whose signal strength exceeds a preset threshold in the time domain impulse response; and determining the delay compensation value of the transmit link according to a delay of the pulse signal.

10. The method according to claim 1, wherein the determining the delay compensation value of the transmit link according to the preset condition and the time domain impulse response comprises:

determining a pulse signal whose signal strength exceeds a preset threshold in the time domain impulse response; and determining the delay compensation value of the transmit link according to a delay of the pulse signal.

11. The method according to claim 10, wherein determining the delay compensation value of the transmit link according to the delay of the pulse signal comprises:

determining a delay of a first pulse signal among pulse signals as the delay compensation value of the transmit link.

12. A device, comprising a memory, a processor, and a computer program stored in the memory and executable on the processor, wherein when executed by the processor, the computer program causes the processor to perform a method for determining a delay compensation value, wherein the method comprises:

obtaining a channel frequency domain impulse response of a transmit link, wherein the transmit link is obtained by combining at least two hardware modules in a transmit circuit;

obtaining a time domain impulse response according to the channel frequency domain impulse response; and determining a delay compensation value of the transmit link according to a preset condition and the time domain impulse response.

13. The device according to claim 12, wherein the obtaining the channel frequency domain impulse response of the transmit link comprises:

combining the at least two hardware modules located in the transmit circuit and used in the transmit link to obtain a combination module;

inputting a wideband time domain signal into the combination module to obtain a time domain output signal of the transmit link;

converting the time domain output signal into a frequency domain output signal;

converting the wideband time domain signal into a frequency domain input signal; and dividing the frequency domain output signal by the frequency domain input signal to obtain the wideband channel frequency domain impulse response of the transmit link.

14. The device according to claim 12, wherein the obtaining the channel frequency domain impulse response of the transmit link comprises:

determining wideband channel frequency domain impulse responses of a plurality of hardware modules in the transmit circuit;

combining the at least two hardware modules among the plurality of hardware modules used in the transmit link; and determining the channel frequency domain impulse response of the transmit link according to wideband channel frequency domain impulse responses of the at least two combined hardware modules.

15. The device according to claim 14, wherein the determining the wideband channel frequency domain impulse responses of the plurality of hardware modules in the transmit circuit comprises:

successively inputting, into a current module, all subcarriers of different frequencies into which a set band is divided and using an output by the current module with regard to the all subcarriers as a wideband channel frequency domain impulse response of the current module;

configuring a next module in the transmit circuit as the current module; and repeatedly performing the step of successively inputting, into the current module, the all subcarriers of different frequencies into which the set band is divided, using the output by the current module with regard to the all subcarriers as the wideband channel frequency domain impulse response of the current module and configuring the next module in the transmit circuit as the current module until the wideband channel frequency impulse responses of the plurality of hardware modules in the transmit circuit are determined.

16. The device according to claim 14, wherein the determining the channel frequency domain impulse response of the transmit link according to the wideband channel frequency domain impulse responses of the at least two combined hardware modules comprises:

multiplying the wideband channel frequency domain impulse responses of the at least two combined hardware modules to determine the channel frequency domain impulse response of the transmit link.

17. The device according to claim 12, wherein the determining the delay compensation value of the transmit link according to the preset condition and the time domain impulse response comprises:

determining a pulse signal whose signal strength exceeds a preset threshold in the time domain impulse response; and determining the delay compensation value of the transmit link according to a delay of the pulse signal.

18. The device according to claim 17, wherein determining the delay compensation value of the transmit link according to the delay of the pulse signal comprises:

determining a delay of a first pulse signal among pulse signals as the delay compensation value of the transmit link.

19. A non-transitory computer-readable storage medium storing a computer program which, when executed by a processor, causes the processor to perform the method for determining a delay compensation value according to claim 1.

* * * * *